United States Patent [19]

Bridgeford

[11] Patent Number: 4,590,107

[45] Date of Patent: May 20, 1986

[54] THIN-WALLED, LOW PLASTICIZED CONTENT REGENERATED CELLULOSE SAUSAGE CASING

[75] Inventor: Douglas J. Bridgeford, Champaign, Ill.

[73] Assignee: Teepak, Inc., Oak Brook, Ill.

[21] Appl. No.: 698,860

[22] Filed: Feb. 11, 1985

Related U.S. Application Data

[63] Continuation of Ser. No. 232,090, Feb. 6, 1981.

[51] Int. Cl.$^4$ .............................................. A22C 13/00
[52] U.S. Cl. .................................... 428/36; 138/118.1; 426/105; 426/135; 428/337; 252/315.2
[58] Field of Search ............... 428/36, 337; 138/118.1; 426/105, 135; 427/434.2

[56] References Cited

U.S. PATENT DOCUMENTS 2,999,756 9/1961 Shiner et al. ..................... 138/118.1

Primary Examiner—John E. Kittle
Assistant Examiner—James J. Seidleck
Attorney, Agent, or Firm—William J. Crossetta; Michael L. Dunn

[57] ABSTRACT

A regenerated cellulose sausage casing and process for its manufacture is disclosed, which casing has a basis weight, wall thickness and plasticizer content substantially lower, and skin content substantially higher, than that of casing products produced in the normal manner by the viscose process but has sufficient strength and flexibility characteristics to undergo high speed commercial shirring and meat stuffing operations with a minimum of breakage and pinholing.

11 Claims, No Drawings

THIN-WALLED, LOW PLASTICIZED CONTENT REGENERATED CELLULOSE SAUSAGE CASING

This is a continuation of application Ser. No. 232,090, filed Feb. 6, 1981.

BACKGROUND OF THE INVENTION

1. Field of the Invention

This invention relates to a thin-walled, shirrable regenerated cellulose sausage casing having a reduced cellulose and plasticizer content and a process for preparing the casing.

2. Prior Art

Artificial sausage casings made entirely of regenerated cellulose have been widely used in the processing of frankfurters and related sausage products for a number of years. The basic process for the manufacture of casings of regenerated cellulose is known as the "viscose process", as for example described in U.S. Pat. No. 2,999,756, U.S. Pat. No. 2,999,757, and U.S. Pat. No. 3,835,113, and comprises extruding viscose, which is a solution of sodium cellulose xanthate, in caustic soda through an annular die into a coagulating bath to form a tubular casing.

The viscose solution is prepared by steeping chemically pure cellulose, typically of a wood or cotton source, in a concentrated caustic soda solution from which an alkali cellulose crumb is obtained. The alkali cellulose crumb is converted to cellulose xanthate crumb by reaction with carbon disulfide. After the reaction, the cellulose xanthate crumb is slurried with an aqueous dilute caustic soda solution in a proportion to yield from about 7 to 8 percent cellulose and a total alkalinity of from about 6 to 7 percent to form the viscose. The viscose usually has a degree of polymerization (D.P.) in the range of about 450–750.

The viscose solution is annularly extruded through an orifice in tubular form and substantially immediately coagulated and regenerated by passing it into an aqueous bath (Muller bath) which contains a mixture of sodium sulfate and sulfuric acid.

The salt/acid mixture is typically concurrently applied to both the outer and interior wall surface to effect simultaneous coagulation and decomposition of the xanthate thus regenerating the cellulose of the extruded product. The resulting wet gel tubing is washed and then plasticized by passing it through a water bath containing a plasticizer such as glycerine or a food acceptable polyol such as propylene glycol or diglycerol. The plasticized gel film is inflated under substantial air pressure and passed through dryer to remove a substantial portion of the water to produce the finished plasticized regenerated casing product.

Though regenerated casings manufactured by the aforesaid process can be utilized without further processing, a large portion of the commercial output is typically subjected to a very harsh and potentially damaging process termed "shirring", to provide lengths of casing in a convenient form for high speed stuffing. In such process, the finished casing is wound on reels and subsequently shirred on high speed shirring machines, such as those described in U.S. Pat. Nos. 2,010,626, 2,583,654, 2,722,714, 2,722,715, 2,723,201 and 3,451,827. In the shirring process, lengths of from 40–200 feet of casing are compacted into pleated strands of a few inches, e.g., 4–30 inches at a rate of 10 to 15 feet per second (ft./sec.). Such compacted strands allow easy handling of long lengths of casing and the meat packing industry considers it desirable to have the longest possible length of casing on a compacted strand. The shirr density, e.g., length of casing per inch of shirred casing is typically limited by the thickness of the casing and the shirring method.

The shirring process imposes several score pleats per foot of casing at extremely high rates of loading so that the casing must be flexible and strong enough to withstand such pleating without damage to the casing wall which later shows up as pinholes during high speed stuffing operations. The rapid extension of the casing during stuffing requires that the casing be especially strong and resistant to tearing. If even minor holes develop in the casing, the casing may split or break during stuffing with the disadvantageous loss of meat product.

After a casing is shirred, it is packaged and shipped to a meat packing house where an individual shirred strand is placed on a stuffing horn and a meat emulsion extruded to fill the casing to its fully extended length. The stuffing of the casing usually takes place within a few seconds with the result that the casing is extended from a shirred length of 8–27 inches to an extended length of 40–160 feet or more at a rate of 2–6 ft/sec.

It is therefore critical to the commercial utility of regenerated cellulose casings manufactured for subsequent shirring that the casing be sufficiently flexible, tear, and pinhole resistant to the harshness of shirring without damage and the resultant shirred strand must also be able to be readily deshirred during high speed stuffing operations without substantial breaking or pinholing. The shirred casing strand must also be of sufficient strength to withstand normal handling required for providing end closures in the casing and placement in high speed stuffing machines.

In order to obtain adequate flexibility and resistance to tear and pinholing, the manufacture of small diameter casing, e.g. up to about 4.0 centimeters in diameter, suitable for shirring has heretofore been commercially practiced under process conditions which assure casing wall thicknesses of about 1.0 mil and a plasticizer content of about 15 percent by weight or greater. Such thickness has been so accepted in commercial manufacture of casings to be shirred that most manufacturers consider a thickness of from 0.97 mil to 1.3 mil for small diameter shirrable casing as standard thickness. As a result of this industry evolved standard, coagulation and regeneration of the cellulose is commercially typically operated utilizing process conditions which maximize plant and casing efficiencies at such thickness. Thus, the coagulation and regeneration process is typically practiced in a single step with the dominant emphasis being the reduction of reaction time. Though both coagulation and regeneration can occur in a typical Muller bath over a wide temperature range, it is well known that the higher the temperature of the bath the faster regeneration occurs. Thus, the commercial practice of the prior art has evolved to maintenance of Muller bath temperatures at the 40°–46° C. range and most preferably at 42° C. to maximize both reactions.

Similarly, the salt/acid content of the Muller bath can be maintained at widely divergent concentrations. The commercial practice of the prior art however is to optimize salt/acid concentration by balancing speed of reaction with chemical cost such that salt concentrations are maintained at their minimum efficient levels in a range from about 150 g/liter to about 250 g/liter and acid concentrations in a range from about 50 g/liter to about 135 g/liter. Typical of the prior art is U.S. Pat. No. 2,999,756 wherein the Muller bath of the examples is maintained at about 40° C. and has a salt concentration of about 150 g/liter and an acid content of about 100 g/liter. In such bath both the coagulation rate and regeneration rate have been commercially and economically balanced to attain standard thickness casing.

Plasticizing of the regenerated casing product has heretofore been considered a necessary step in the conventional manufacture of small diameter regenerated cellulose sausage casing to impart sufficient flexibility and stretch characteristics to the casing to allow it to be shirred at high speeds and to prevent bursts during subsequent stuffing operations. Typically, an amount of plasticizer is incorporated in 1.0 mil standard regenerated cellulose sausage casing which is sufficient to provide adequate flexibility to the casing so that it can be safely subjected to high speed shirring without cracking or pinholing and thereafter will withstand the rigors of stuffing. In a standard 1.0 mil regenerated cellulosic sausage casing typically comprising about 65 percent cellulose, the amount of plasticizer required by the prior art to attain adequate levels of flexibility is between 15 percent to 25 percent of the total weight of the plasticized casing. Even containing such quantities of plasticizer, the standard 1.0 mil casing is also typically moistened to 16-20 percent moisture content during shirring to impart additional flexibility properties. Indeed, the necessity of plasticizers in shirrable casings is so imbedded in commercial practice that the author knows of no commercially available small diameter shirrable casing of standard thickness or less which contains less than about 15 percent plasticizer. At such standard thickness, a regenerated cellulosic casing containing from 15 percent to 25 percent plasticizer is seen in the prior art as having optimal flexibility and stretch characteristics for preventing bursts. Smaller thickness casings, down to 0.5 mil, using standard amounts of plasticizer, were speculated as having too little resistance to burst pressure and therefore not commercially practical. Greater thicknesses of small diameter casing, up to 1.5 mil were considered as merely a waste of materials and as adding characteristics which were undesirable to the consumer. Thus, the film wall of shirrable casings formed by the processes of the prior art and used for the processing of sausages generally commercially range in dry casing thickness from about 1.0 mil for small diameter shirrable casings to 3.8 mil for large diameter shirrable casings, e.g. greater than about 4.0 centimeters in diameter, or greater depending upon the circumference of the casing.

The amount of cellulose material per unit length of dried casing is conveniently indexed in the sausage casing art in terms of the weight of cellulose expressed in grams per 10 meters length (g/10 m) of a given casing width range or "Bone Dry Gauge" (BDG). The amount of cellulose material is also conveniently indexed by the weight in grams of cellulose per square meter ($g/m^2$) and is termed "Basis Weight". The BDG of a casing will generally be varied by the manufacturer with the stuffing diameter of the casing as will the thickness. On the basis of comparative commercial tests, the BDG for a small diameter shirrable casing such as, for example, casing having a recommended stuffing diameter of 22.0-23.0 millimeter (mm) (Code 25), used for the processing of frankfurters, is typically 20 g/10 m and has a thickness of about 1.1 mil. The recommended stuffing diameter of regenerated cellulose casings used for small diameter type applications normally ranges from about Code 13 (13.0-15.5 mm) to about Code 52 (49.0-50.0 mm). For this small casing recommended stuffing diameter range the Basis Weight of the prior art casing typically ranges from about 24 for Code 13 casing to about 34 grams per square meter ($g/m^2$) for Code 52 casing, the BDG ranges from about 10.2 for Code 13 casing to about 31.2 g/10 m for Code 52 casing and the dried wall thickness from about 0.97 to about 1.3 mil.

Though BDG is widely used as a convenient index of casing thickness, comparisons therebetween are generally only appropriate for casing walls having the same recommended stuffing diameter and composite structure. Thus, two casings of the same recommended stuffing diameter may have the same BDG but if the composite structure of one is different than the other, the thickness of the casings will generally be different. I have found that in a regenerated cellulose casing the morphology or microstructure of the regenerated cellulose casing wall is composed primarily of an outer skin portion on both the exterior and interior sides of the wall, the skin being characterized by large, poorly ordered amorphous regions and small or imperfect crystalline regions and an inner, less dense, core portion characterized by large crystalline regions separated by amorphous regions of fairly high order; the skin and core sections of the wall structure being readily distinguished from each other when samples of a torn dehydrated section are examined under a scanning electron microscope, the skin portion being tougher than the core and appearing more dense. Thus, the cross section of a regenerated cellulose casing wall appears to be comprised of two smaller crystalline outer skin laminates usually of higher density and a larger crystalline core of usually lower density such that by decreasing the amount of core material and increasing the amount of skin, the thickness of the casing can be significantly reduced while maintaining the BDG constant.

I have found that the wall of a conventional prepared Code 25 cellulose casing having a BDG of 20 g/10 m made under conventional commercial viscose process conditions will have a skin layer forming about 10 to less than 20 percent of the total casing wall cross-sectional area and typically averages about 15%. At such levels of skin content, I have found that standard thickness regenerated cellulosic casing typically has inadequate circumferential expansion and flexibility characteristics for utilization as a shirrable sausage casing without the addition of a plasticizer. In order to cure such defect the coagulated and regenerated gel casing is treated in the prior art by impregnating with from about 15 to about 25 percent by weight of a plasticizer, and then dried to form the final casing product.

Economic incentive exists to substantially reduce the Basis Weight and accordingly the BDG of the casing as well as to reduce or eliminate the expensive plasticizer component. Reduction of casing thickness is also desirable as it allows production of a shirred product having a higher shirr density. Prior efforts to reduce the Basis Weight of regenerated cellulose casing made under conventional viscose process conditions, however, resulted in casing products which were of insufficient strength for shirring and stuffing under modern commercial conditions. Attempts to manufacture casing of standard Basis Weight, but with elimination of the plasticizer, resulted in a shirred casing exhibiting a 50 percent tensile strength loss which encountered unacceptable high breakage during high speed commercial meat stuffing.

SUMMARY OF THE INVENTION

In accordance with the present invention a lower cost, shirrable regenerated cellulose casing having improved casing physical properties is obtained with a regenerated cellulose casing of substantially reduced Basis Weight, e.g. reduced 20–45 percent or more from normal, a substantially reduced plasticizer content, e.g., 10 percent or less, and a substantially reduced thickness, the casing having the requisite strength and flexibility to undergo commercial high speed shirring and meat stuffing operations without substantial breakage or pinholing.

The high strength, low plasticizer content, thin-walled shirrable regenerated cellulose sausage casing of the present invention is produced by modifying the economically balanced standard viscose process from conditions wherein concurrent relative rates of coagulation and regeneration are optimized, to process conditions wherein relative rates of coagulation and regeneration of the extruded tubular casing are so altered that a significant reduction in the regeneration rate of the xanthate tubular extrudate relative to the coagulation rate is effected. Such modification is achieved by the use of lower Muller bath temperatures, namely, in the range of 22° to 38° C., preferably 28° to 34° C., a relative decreased regenerating acid content in the order of 90 to 130, preferably 100 to 120 g/l, and an increased dehydrating salt content, namely, in the order of 200 to 300 g/l and preferably 250 to 280 g/l in the Muller bath. One of skill in the art would understand that under a normal balanced conventional viscose system any reduction of temperature of the Muller bath would require an undesirable higher acid to salt ratio to balance the rates of regeneration and coagulation. There would therefore have been no obvious reason to reduce the temperature, thus increasing processing time or increasing cost by requiring more acid. The instant low temperature process is contrary to the reasoning of the prior art because overall process time is intentionally increased which is precisely contrary to the teachings of the prior art. A four fold or thereabout decrease in regeneration rate results while maintaining the approximate coagulation rate (16% or less decrease) which would be expected in a higher temperature (40°–46° C.) system. The disadvantages of the present process as would be expected from teachings of the prior art, are more than overcome by the unobvious and unexpected advantages. The resulting product unexpectedly has a greater percentage of skin in its cross section than that of the prior art and a higher density than standard regenerated cellulose sausage casing.

Thus, by the practice of the present invention, regenerated cellulose sausage casing having the flexibility and strength to withstand commercial shirring and meat stuffing operations is obtained which can be produced at a reduced wall thickness, e.g. below about 0.90 mils for small diameter casings and a reduced plasticizer content of 0–14 by weight and preferably 0–10 percent, as compared to prior art casing wherein the average wall thickness is about 1.0 mil and plasticizer content is 15–25 percent by weight. The morphology of the casing wall is so modified from typical commercial casing that unexpectedly the casings of the present invention generally may also be manufactured at a substantially lower Basis Weight and lower bone dry gauge than equivalent diameter conventional casing. For example, Code 25 casing of the present invention can be manufactured at a BDG of about 12 to 16 g/10 m as compared with an average BDG of 20 g/10 m in conventionally processed Code 25 casing and a Basis Weight of about 17–23 gm/m² as compared to the conventional average of 29 gm/m² of the prior art. In addition, the casing of the instant invention has a density of about 1.46 to 1.53 g/cc as compared to a conventional density of about 1.37 to 1.40 g/cc; can be produced having a reduced optimal wall thickness of from about 0.40 to about 0.90 mil as compared to prior art thicknesses of 1.0 mil and larger; and, has a higher skin to core content in excess of about 20 percent as compared to the prior art average 15 percent.

The casing products of the present invention can be shirred and stuffed without appreciable increase in the defect level, e.g., in pinholing or strand breakage, when compared with conventional thick walled casing. The casing product of the present invention is typically appreciably denser than prior art casing which I attribute to the appreciable absence of voids normally present in prior art casing. The presence of these voids, which appear to be caused by the entrapment of gaseous regeneration by-products during the coagulation/regeneration step of casing manufacture, appears to be produced by the lowering of the rate of cellulose regeneration relative to the rate of coagulation. I suspect that the reduced rate of regeneration results in the slower release of bubbles of escaping gasses which, coupled with the reduced impediment to flow inherent in the thinner, relatively impermeable walls of the rapidly coagulating gel tubing, cause the formation of a denser core and outer skin than achieved in standard casing.

By the practice of the present invention the skin layer of the casing wall may be increased to levels in the order of 20 percent or as high as 100 percent of the total casing wall, the skin layer levels increasing as the temperature of the coagulation bath is decreased at a constant bath concentration. The increase in skin content appears to effect a decrease in permeability of the casing to low molecular weight specie. Generally, skin levels from about 20 to about 55 percent of the total casing wall are preferred.

PREFERRED EMBODIMENTS

As previously described, the shirrable regenerated cellulose sausage casing of the present invention is produced by extruding a thin-walled extrudate of an alkaline viscose solution of conventional composition into a low temperature coagulation bath having a relatively low acid content and a relatively high dehydrating salt content. The alkaline viscose solution is prepared by conventional procedures well known in the art and advantageously contains from about 6 to about 8 percent by weight cellulose and about 5 to about 8 percent by weight total alkalinity, the cellulose xanthate being derived from an alkali cellulose crumb having a DP in the order of 450 to 750 and preferably 550 to 650.

The viscose solution once prepared is extruded through an annular die of the type conventionally employed for the extrusion of tubular casings at the rate of 100 to 180 feet per minute (fpm) and preferably 110 to 150 fpm into a Muller coagulation bath maintained at a temperature of 22° to 38° C., preferably 28° to 34° C. containing from about 200 to 300 g/l and preferably about 250 to 280 g/l sodium sulfate and 90 to 130 g/l, preferably 100 to 130 g/l sulfuric acid. For a given contact time in the coagulation bath, the percent skin morphology increases as the temperature of the bath is decreased, as the salt concentration is increased, as the acid concentration decreased and as the xanthate content of the viscose is increased.

To achieve a reduction in casing wall thickness to prepare the thin-walled casing product of the present invention, the annular clearance of the viscose process die through which the viscose is extruded can be narrowed compared to the die orifice used for conventional, wall casing, i.e., the orifice clearance is reduced from the standard 11.5–12.0 mil clearance to about 9 mil or less. Alternatively, and preferably, the reduction in casing wall thickness can be achieved simply by using a conventional extrusion die having 11.5–12.0 mil annular clearance and pumping the viscose to the die at a proportionately lower, e.g., 25 to 40 percent lower, volume rate, so that at a fixed machine speed, the extruded casing is drawn from the die at the same linear speed as the thicker casing but with less volume of material per unit length.

After thin wall extrusion, the coagulated but only slightly regenerated tubing is generally withdrawn from the low acid content coagulation bath and passed into a water wash bath to remove carryover salts from the coagulation bath. The seamless cellulosic gel tubing thus formed is then successively passed through a series of conventional regeneration baths containing aqueous solutions of low concentrations of coagulation salts and acid and thereafter through a series of counter-current water baths to remove the acid and salts remaining in the casing. The washed cellulosic tubing, which is still in a gel-like state can, if desired, be passed through a plasticizer bath composed of a solution of a water soluble hydroscopic plasticizer such as glycerine, sorbitol or a glycol such as propylene glycol. The passage of the casing through the plasticizer bath is adjusted so that no more than about 14 percent by weight of the plasticizer is added to the gel casing. For many sausage casing applications, the plasticizer bath is eliminated entirely. The concentration of the plasticizer, when present in the regenerated cellulose casing product of the present invention, is preferably less than about 10 percent and ranges from 0 to 10 percent by weight of the casing.

The washed gel tubing is then dried to obtain the final casing product. Drying is accomplished by passing the casing through a hot-air dryer of the type conventionally used in the viscose process which is comprised of a heating tunnel having paired sets of rotating squeeze rolls at the entrance and exit stations. Heated air is circulated in the tunnel and the gel casing is continuously advanced through the tunnel by means of the paired rotating entrance and exit rollers. An inflating quantity of air is confined within that part of the casing extending between the entrance and exit rolls. The exit rolls are driven at the same or slightly higher peripheral speed than the inlet rolls to effect longitudinal orientation. The casing is inflated to effect distention of the circumferential diameter, typically in the range of 12 to 60 percent. The temperature at which drying is accomplished is conventionally about 225° to 300° F. However, because of the reduced thickness of the casings of the present invention, drying, using the same conventional hot air driers, can be accomplished at temperatures 30° to 80° F. lower, i.e., at about 150° to 200° F. Thus, the process of the invention can result in significant, unexpected energy savings. The gel tubing is dried to a moisture content of about 6 to about 12 percent by weight and preferably 9 to 11 percent by weight.

After drying, the cellulose casing is flattened in its passage through the exit rolls and is then wound on reels. The dried flattened casings then undergo conventional shirring operations by methods known to the art as previously discussed above, and the casings in the shirred state are shipped to the meat packer for the processing of sausage meats.

The regenerated cellulose sausage casing produced in this manner is a low Basis Weight, thin-walled (0.40–0.90 mil) casing having a low (0–14 percent by weight) plasticizer content, which in spite of the low plasticizer content is very flexible and can be easily handled during further processing, i.e., shirring, stuffing with sausage meat and tying off of the finished sausages.

While the low Basis Weight casing of the present invention, absent all plasticizer content can be shirred without damage and stuffed at a commercially acceptable low defect level, plasticizer at a concentration of about 3 to 10 percent by weight can be optionally incorporated in the casing to provide humectant or hydroscopiscity properties to the casing to retard the loss of moisture from the shirred strand when the strands are exposed to low humidity conditions. However, if adequate packaging and adequate control of the use of the casings in the packing plant is provided, the plasticizer addition is not required.

Because of the thinner wall dimensions of the casing, the casing can be shirred to produce a shirred strand which is 10 to 60 percent shorter for a given casing length than conventional shirred strands or conversely which may contain 10 to 150% more casing per defined strand length. The resulting higher shirred density product can contain significantly more casing per strand length or can be shorter making it easier to handle and require less packaging and storage space.

The low Basis Weight casing product of the present invention has been unexpectedly found to be stuffable with "frozen" i.e., 22° to 32° F., meat emulsion at a very low defect level. Frozen meat emulsion is used for stuffing sausage products derived from turkey or chicken. The use of the frozen emulsion is necessary to minimize the incidence of microbiological activity during sausage processing. Conventional sausage casings formed from plasticized regenerated cellulose encounter a high defect level, e.g., 20 to 40 percent when stuffed with cold meat emulsion.

The invention will be further illustrated by reference to the following specific Examples.

EXAMPLE I

In a series of runs to prepare Code 25 casing, a solution of viscose having a DP of 600, containing 7.7% by weight of cellulose and 6.5% by weight celcuated sodium hydroxide and having a viscosity of 72 falling-ball seconds at 18° C. and extruded under pressure through an annular slot die at a rate of 110 fpm, a process during which it formed a tubular body. To achieve a reduction in Basis Weight, the viscose was pumped to the die lip at volume rates which were 25 to 40% lower than conventionally employed, e.g., 522 to 653 grams per minute (g/min) as compared to 870 g/min conventionally used to prepare Code 25 casing.

The thin-walled tubing of the invention was extruded in different runs into a coagulation bath maintained at temperatures varying from 29.6°–36.4° C., the bath being composed of an aqueous solution containing from about 100–130.5 g/l sulfuric acid and from 255–272 g/l sodium sulfate. The coagulated gel tube was prepared by extrusion through a 12.0 mil orifice and withdrawn from the coagulation bath at the extrusion rate of 110 fpm and at varying viscose flow rates to obtain the various thickness tubing of the invention. The extruded and coagulated tubing was then passed through a water bath at 25° C. to remove occluded coagulation bath salts from the casing and then through several successive regenerating baths, the regenerating baths having a concentration of sulfuric acid and sodium sulfate which increased from 35 g/l by weight sulfuric acid and 100 g/l sodium sulfate in the first of these baths to 75 g/l sulfuric acid and 120 g/l sodium sulfate in the last of these baths. The gel casing was withdrawn from the terminal regeneration bath and passed through a series of counter-current flow water wash baths at a temperature of 35°–60° C. The washed casing was passed through a bath containing an 11% by weight glycerine water solution which had been adjusted to a pH of 7.0 with sulfuric acid. The time the casing was immersed in the bath was adjusted so that the final casing product would contain 0–20% by weight glycerine.

The plasticized tube was dried by passing the tube, in an inflated state through a hot air dryer, the air temperature being varied from 150°–260° F. at the dryer entrance and maintained at 130° F. and 118° F. at the midpoint and end stations. After exiting the dryer, the dried casing was wound on a reel.

The dried casing product was Code 25 (22.0–23.0 mm diameter), unless otherwise noted, had a moisture content of about 9% (7–13%) and was quite flexible. Measurements taken of the casings indicated that they had a BDG range of 12.2–15.2 g/10 m. Examination under the SEM of torn dehydrated wall portions of the casing product indicated that the skin area of the casing wall ranged from about 20–44% of the total cross-sectional area of the casing.

The process conditions used to prepare these casings are summarized in Table I. The physical properties of the casing are summarized in Tables II–III.

In Table II the tensile and other physical properties were measured on one set of conditioned casing using an Instron tester. Conditioned casing was obtained by maintaining a casing in a room at 75° F. and a relative humidity of 60% until moisture equilibrium with the atmosphere was attained. Conditioned casing physical properties give an approximation of casing characteristics under controlled moisture content.

In Table III the tensile and other physical properties of rewet casing is recorded. Rewet casing is casing wet in water and the tensile properties give an approximation of the casing characteristics during stuffing, after wet-out by the encased meat product.

For purposes of displaying contrasting methods of preparation, five series of experiments (runs) were performed with variations to acid/salt ratio and concentration, Muller bath temperature and tubing thickness. Two runs (G and J) were performed at higher extrusion speeds to ascertain the effect of reduced coagulation time. In general, it was ascertained that the overall Mullar bath temperature had the major effect on the percentage of skin formed in the tubing wall, while within the temperature range of the invention the relative ratio of salt/acid concentration had increasing significance as did tubing thickness. In the Muller bath temperature ranges generally practiced commercially, variation from moderate to high salt/acid ratios resulted in little effect on the percent skin formation. At the lower temperature ranges of the invention, multiple variations of tubing thickness and Muller bath, salt/acid ratio could be combined to attain skin percentages in excess of 20% as required by the invention. Reduction of Muller bath contact time by increasing extrusion speed appears to decrease the formation of percent skin but also appears to be correctable by increasing the salt/acid ratio (see G and J).

TABLE I

| | | | Process Conditions | | | | | | | | |
|---|---|---|---|---|---|---|---|---|---|---|---|
| | | | Coagulation Conditions | | | | Physical Properties | | | | Temp. (°F.) at |
| Series | Run No. | Thickness (mil) | Temp °C. | Acid g/l | Salt g/l | % Glycerine | BDG g/10 m | Basis Wt. g/m$^2$ | % Skin | % H$_2$O | Dryer Entrance |
| 1 | A | 1.10 | 42.0 | 127.0 | 147 | 20.0 | 20.3 | 29.2 | 14.0 | 9–11 | 210–220 |
| | B(1) | 1.05 | 29.6 | 114.0 | 171 | 0 | 13.7 | 21.6 | 26.0 | — | — |
| 2 | C | 0.82 | 42.0 | 124.0 | 255 | 0 | 20.4 | 29.2 | 15.9 | 10.7 | 260 |
| | D(1) | 0.83 | 31.2 | 117.0 | 272 | 12.0 | 14.1 | 22.2 | 20.8 | — | — |
| | E(1) | 0.84 | 31.2 | 119.0 | 272 | 24.0 | 13.9 | 21.9 | 24.9 | 10.5 | 135 |
| | F | 0.86 | 33.0 | 108.0 | 269 | 13.8 | 15.2 | 22.1 | 29.6 | — | — |
| 3 | G** | 0.77 | 36.4 | 101.0 | 270 | 13.6 | 15.1 | 22.0 | 28–32 | 12.9 | 210 |
| | H | 0.76 | 33.0 | 130.5 | 255 | 20.63 | 15.0 | 21.8 | 28.0 | 9.3 | 180 |
| | I | 0.71 | 33.4 | 102.0 | 269 | 0 | 14.8 | 21.5 | 32.2 | — | — |
| | J* | 0.69 | 36.0 | 124.0 | 255 | 12.0 | 15.1 | 21.9 | 26.1 | 9.5 | 205 |
| | K | 0.67 | 33.0 | 130.5 | 255 | 11.76 | 15.0 | 21.8 | 21.5 | 9.6 | 180 |
| | L | 0.59 | 33.7 | 121.0 | 271 | 12.8 | 14.7 | 21.4 | 33.7 | 8.4 | 170 |
| | M | 0.60 | 32.0 | 124.0 | 257 | 0 | 15.2 | 22.1 | 35.9 | 10.2 | 180 |
| 4 | N | 0.59 | 30.3 | 103.0 | 270 | 0 | 14.7 | — | 40.8 | — | 140 |
| | O | 0.59 | 30.3 | 103.0 | 270 | 12.6 | 14.7 | 21.4 | 40.8 | 13.8 | 140 |
| | P | 0.59 | 33.7 | 121.0 | 271 | 0 | 14.7 | — | 33.7 | — | 170 |
| x 5 | X | 0.47 | 30.2 | 125.0 | 255 | 0 | 12.2 | 17.7 | 32.3 | 7.2 | 150 |

(1) Code 23
**Extrusion Speed = 145 l/min
*Extrusion Speed = 125 l/min

TABLE II

| Conditioned (60%) Casing Tensile Properties (Flat Stock) | | | | | | | |
|---|---|---|---|---|---|---|---|
| | | Break Tensile | | Elongation | | Break Energy | |
| | Run | psi | | % | | In. Lbs. | |
| Series | No. | Long. | Trans. | Long. | Trans. | Long. | Trans. |
| 1 | A | 18600 | 13800 | 52.0 | 85.0 | — | — |
| | B | 21747 | 21018 | 14.0 | 38.3 | 3.071 | 4.267 |
| 2 | C | 23691 | 24773 | 14.4 | 39.0 | 4.956 | 8.157 |
| | D | 17930 | 17302 | 21.0 | 53.8 | 4.395 | 5.571 |
| | E | 13807 | 13216 | 27.5 | 72.3 | 5.101 | 6.321 |
| | F | — | 15795 | — | 63.0 | — | 7.25 |
| 3 | G | — | 17671 | — | 55.9 | — | 6.35 |

TABLE II-continued

Conditioned (60%) Casing Tensile Properties (Flat Stock)

| Series | Run No. | Break Tensile psi Long. | Break Tensile psi Trans. | Elongation % Long. | Elongation % Trans. | Break Energy In. Lbs. Long. | Break Energy In. Lbs. Trans. |
|---|---|---|---|---|---|---|---|
|  | H | 18203 | 15962 | 27.7 | 67.1 | 6.247 | 7.570 |
|  | I | — | 19189 | — | 43.0 | — | 6.16 |
|  | J | 20005 | 19617 | 31.0 | 49.5 | 4.818 | 6.593 |
|  | K | 19847 | 20227 | 19.9 | 53.9 | 4.597 | 7.457 |
| 4 | M | 23293 | 24505 | 13.8 | 41.4 | 3.424 | 6.460 |
|  | N | 18900 | 19720 | 16.0 | 57.0 | — | — |
|  | O | 16500 | 13490 | 26.0 | 67.0 | — | — |
| 5 | X | 23746 | 24187 | 12.5 | 41.7 | 2.419 | 5.090 |

Runs A and B (Series 1) show a direct comparison of standard thickness tubing (1.1±0.1 mil) made in accord with standard commercial procedures and the procedures of the invention. The Muller bath of Run A was operated at a typical balanced acid to salt ratio in accord with U.S. Pat. No. 2,999,757 at a temperature of 42° C. The Muller bath of Run B was operated at a higher salt/acid ratio in accord with the process of the invention and a temperature of about 29.6° C. The tubing product prepared in accord with the invention had almost twice the percentage skin as that of the standard tubing product and a BDG and Basis Weight approximately ⅓ less than that of said standard product.

Runs C, D, E, and F (Series 2) show a direct comparison of 0.84±0.02 mil thickness tubing wherein coagulating temperature and/or salt/acid ratio is varied to produce the tubing of the invention. Run C comprises a high salt to acid ratio Muller bath chemical balance in accord with the method of the invention but maintains temperature at standard levels to produce a tubing having a BDG, Basis Weight and percent skin content in the range of standard commercial products. Runs D, E, and F use high salt to acid ratio in the Muller bath as used in Run C but combined with temperature restraints in accord with the invention produce high skin content (24.9 and 29.6) and reduced BDG and basis weight in accord with the invention.

Runs G through K (Series 3) show a direct comparison of 0.7±0.1 mil thickness tubing wherein the Muller bath is maintained at the temperatures and high salt/acid balance range of the invention but with the addition of varying levels of glycerine. As should be noted, the BDG and Basis Weight are maintained consistently low relative to standard process conditions and percentage skin is maintained high. Varying levels of glycerine were added for use in subsequent tests.

Runs L through P (Series 4) show direct comparison of thin wall tubing 0.6±0.01 mil, utilizing a Muller bath containing high salt to acid concentration within the preferred temperature range of the invention. Again, the higher levels of skin content are readily apparent especially when compared to the higher temperatures of Series 3, 2, and 1 while the BDG and Basis Weight are similarly significantly reduced. The various glycerine content is to show effect upon other properties hereafter tested.

Run X (Series 5) shows a direct comparison of a thin wall tubing (0.47 mil) which is approximately ½ the thickness of standard tubing runs at a preferred coagulating temperature and salt/acid ratio. The high skin content relative to the low BDG and Basis Weight is readily apparent.

With reference to Tables I and II the tensile properties of conditioned casing made in accordance with the conventional viscose process (Run A) are such that the break tensile strength in the transverse direction is substantially less (e.g., 60–90%) than that in the longitudinal direction.

In casings manufactured in accordance with the present invention the tensile strengths in both the longitudinal and transverse directions were substantially the same or isotropic. The isotropic character of the casing is desirable because when a casing is stuffed and linked with high speed stuffing machines, the links created in the casing by the twisting action used in linking imposes a circumferential stress on the casing. A high tensile strength in the transverse direction enables the casing to better withstand such linking stresses.

TABLE III

Rewet Casing Tensile Properties

| Series | Run No. | Break Tensile psi Long. | Break Tensile psi Trans. | Elongation % Long. | Elongation % Trans. | Break Energy In. Lbs. Long. | Break Energy In. Lbs. Trans. |
|---|---|---|---|---|---|---|---|
| 1 | A | 4500 | 4000 | 55 | 145 | — | — |
|  | B | 4156 | 4611 | 31 | 81 | 1.89 | 2.43 |
| 2 | C | 5286 | 6174 | 50 | 99 | 5.61 | 7.17 |
|  | D | 3802 | 4262 | 34 | 86 | 2.22 | 2.86 |
|  | E | 3711 | 3779 | 34 | 85 | 2.64 | 2.66 |
|  | F | — | 5912 | — | 104 | — | 5.204 |
| 3 | G | — | 5543 | — | 88 | — | 4.842 |
|  | H | 4501 | 4885 | 44 | 46 | — | — |
|  | I | — | 4598 | — | 87 | — | 4.03 |
|  | J | 4825 | 5791 | 47 | 110 | 4.18 | 5.79 |
|  | K | 4751 | 5776 | 46 | 106 | 3.64 | 5.18 |
| 4 | M | 5333 | 5561 | 46 | 97 | 3.91 | 4.32 |
|  | N | 5155 | 5457 | 42 | 107 | 4.13 | 5.22 |
|  | P | 5847 | 6299 | 47 | 105 | 4.54 | 5.50 |
| 5 | X | 5010 | 5998 | 42 | 103 | 2.76 | 3.89 |

Energy is a measure of the toughness of the casing under the test conditions and is the area under Tensile-Elongation curve.

The data in Table III shows that the rewet tensile properties of low Basis Weight casing made in accordance with the present invention is equal to or greater than cellulose casing made in accordance with the conventional viscose process.

EXAMPLE II

The casings prepared in Example I were also subjected to the following evaluation tests: permeability, apparent porosity and density. The results of these tests are summarized in Table IV.

TABLE IV

Permeability Evaluations

| Series | Run No. | Permeability cm/hr | Apparent Porosity ($cm^2$/sec $\times$ 10-7) | Density g/cc |
|---|---|---|---|---|
| 1 | A | 0.175–0.214 | 3.15–3.85 | 1.342–1.359 |
|  | B | 0.239 | 2.83 | — |
| 2 | C | 0.220 | 3.25 | 1.5102 |
|  | D | 0.260 | 3.21 | — |
|  | E | 0.226 | 3.12 | — |
|  | F | 0.399 | 5.01 | — |
| 3 | G | 0.374 | 5.11 | — |
|  | H | 0.227 | 3.08 | 1.4652 |
|  | I | 0.265 | 3.32 | 1.4712 |
|  | J | 0.328 | 3.67 | — |
|  | K | 0.218 | 2.63 | 1.5222 |
| 4 | M | 0.220 | 2.40 | 1.4904 |
|  | N | 0.328 | 3.59 | — |
|  | O | 0.387 | 4.63 | — |
| 5 | X | 0.258 | 2.08 | 1.5014 |

Permeability is determined by the diffusion rate (centimeters per hour) of a 1% solution of potassium ferricyanide and was used to index the porosity of the casing wall to low molecular weight compounds.

Permeability is a measure of moisture evaporation from the encased frankfurter during processing as well as access to smoke to the meat during cooking and smoking of the encased meat product.

Permeability is the absolute measurement of the rate of permeation through the casing wall with no correction for wall thickness. Apparent porosity is a measure of the relative inherent porosity of the casing wall. Apparent porosity is obtained by multiplying the measured permeability by the wet thickness of the casing wall.

Density is determined by immersion of a casing section in xylene in a pycnometer. The higher the density the less microscopic or submicroscopic voids present in the casing. Higher densities also reflect the extent of highly ordered volume elements in the cellulose.

The data in Table IV indicates that although the low basis weight casings of the present invention were denser and had a measured permeability consistently less than that of conventional casing (Run No. A), the apparent porosity was reasonably equivalent due to the thinner walls of the low basis weight casing, wherein the low Basis Weight casings remain amenable to smoke and other gaseous casing agents used in sausage meat manufacture. The rough equivalence of apparent porosity with conventional casing has significance in that it allows use of mixed smoke house loads containing the casing of the instant invention and standard prior art casings.

EXAMPLE III

The casings prepared in Example I were also subjected to the following additional evaluation tests: Rewet Flat width (RWFW), Recommended Stuffing Diameter Pressure (RSD), Burst Pressure and Burst Diameter. The results are summarized in Table V.

TABLE V

Stuffing Evaluation Tests

| Series | Run No. | RWFW (mm) | RSD Press (cm Hg) | Burst Pressure (cm Hg) | Burst Diameter (mm) |
|---|---|---|---|---|---|
| 1 | A | 38.2 | 12.8 | 32.5 | — |
|   | B | 28.6 | 11.5 | 31.1 | — |
| 2 | C | 33.4 | 9.6 | 35.8 | 33.9 |
|   | D | 27.5 | 14.2 | 31.2 | — |
|   | E | 26.6 | 15.0 | 29.7 | — |
|   | F | 32–33.5 | 19.8 | 27.3 | — |
| 3 | G | 32–33.5 | 21.3 | 28.5 | — |
|   | H | 31.9 | 10.9 | 24.9 | 36.3 |
|   | I | 32–33.5 | — | — | — |
|   | J | — | — | 26.7 | 35.0 |
|   | K | 32.3 | 10.9 | 27.0 | 34.5 |
| 4 | M | 33.6 | 7.8 | 26.7 | 33.2 |
|   | N | — | — | 29.3 | — |
|   | P | — | — | 29.0 | — |
| 5 | X | 33.5 | 6.4 | 20.9 | 35.5 |

RWFW is the rewet flat width and is the width in millimeters that the casing acquires when wet in water for 20 minutes at room temperature.

The RWFW data in Table V indicates that the RWFW of casing prepared in accordance with the practice of the present invention is controllable to present commercial standards.

Recommended stuffing diameter (RSD) is the diameter to which the meat packer should stuff the casing to secure firm links of encased sausage meat having the required reproducible weight and ease of peeling of the casing from the sausage meat. Overstuffing results in excessive casing breakage and poor peeling. The recommended stuffing diameter of Code 23 is 20.5 mm and 22.5 mm for Code 25. RSD pressure is the pressure which the casing will be under when stuffed to the recommended stuffing diameter. It will differ with each code.

Burst pressure is the pressure to which the casing can undergo before burst. Burst diameter is the average diameter of the casing at burst. The burst diameter will be substantially larger than the recommended stuffing diameter and provides a leeway for pressure variations in the stuffing machine.

Burst pressure and burst diameter is determined by clamping the ends of a length of casing and introducing air rapidly into the casing. The expanded diameter is measured by a noncontact means and pressure is measured corresponding to each of the diameter measurements. The pressure at which the casing bursts is recorded in centimeters of mercury and the diameter at burst is reported in millimeters.

The data in Table V shows that in casing made in accordance with the practice of the present invention the burst diameter is nearly constant over a wide range of burst pressure.

EXAMPLE IV

The Code 25 casings prepared in Example I were conditioned and then shirred using conventional shirring equipment. The tensile properties of the shirred casing were measured and these measurements are summarized in Table VI.

The term "conditioned casing" means casing that has been exposed to constant humidity and temperature for a time sufficient for the casing to come to a moisture equilibrium with the humidified atmosphere. The casing when conditioned at 60% relative humidity (RH) will equilibrate after 24 hours at 72° F. to a moisture content of about 12 to 14%, and at 80% RH at 72° F. for 24 hours the casing will equilibrate to a moisture content of 18 to 20%.

The break tensile of unshirred conventional viscose process casing is normally in the range of 18,000–19,000 psi in the longitudinal (L) direction and 16,000–17,000 psi in the transverse (T) direction and an elongation of 45–50% in the longitudinal direction and 70% in the transverse direction. The unshirred conventional casing when subjected to rewet conditions has a break tensile of 5,192 psi in the longitudinal direction and 4,698 in the transverse direction and an elongation of 81% in the longitudinal direction and 146% in the transverse direction.

TABLE VI

Effect of Shirring on Tensile Properties As Manufactured Casing

| | TENSILE (psi) | | | | ELONGATION % | | | |
|---|---|---|---|---|---|---|---|---|
| Run | 60% RH | | 80% RH | | 60% RH | | 80% RH | |
| No. | L | T | L | T | L | T | L | T |
| C* | — | — | 9,674 | 11,626 | — | — | 34.2 | 32.8 |
| F | 17,400 | — | 15,020 | — | 28.7 | — | 32.0 | — |
| I | 22,140 | — | 19,340 | — | 16.2 | — | 22.0 | — |
| G | 19,264 | — | 16,660 | — | 20.0 | — | 29.0 | — |
| A | — | — | 18,000–19,000 | 16,000–17,000 | — | — | 40.0–45.0 | 65.0 |
| Under Rewet Conditions | | | | | | | | |
| M | — | — | 6,013 | 6,905 | — | — | 47.0 | 101.0 |
| X | — | — | 6,013 | 6,140 | — | — | 48.0 | 97.0 |
| B | — | — | 5,921 | 6,000 | — | — | 44.0 | 86.0 |
| F | — | — | — | 5,981 | — | — | — | 107.0 |
| A | — | — | 4,935 | 4,740 | — | — | 50.0 | 98.0 |

*Break Tensile and Elongation in unshirred state were as follows:

TABLE VI-continued
Effect of Shirring on Tensile Properties
As Manufactured Casing

| Break Tensile (psi) | | Elongation (%) | |
|---|---|---|---|
| L | T | L | T |
| 23,690 | 23,773 | 14.4 | 39.0 |

The data in Table VI indicates that the tensile properties of conventional casing (Run A) and low basis weight casing prepared in accordance with the practice of the present invention (Runs F, I, G) do not undergo substantial loss of tensile properties when shirred, whereas as glycerine-free cellulose casing having a normal BDG level, e.g., 20.4 g/10 m, (Run C) encounters a substantial reduction in tensile strength after shirring.

The rewet data in Table VI indicates that adequate tensile strength is present for the thin-walled casing of the present invention even in the rewet state.

EXAMPLE V

Some casings prepared in Example I were shirred and subjected to meat stuffing operations.

In the manufacture of frankfurters, a meat emulsion is pumped into the shirred casing, the meat is cooked and cured in the casing and then peeled away from the cooked meat to obtain a "skinless" frankfurter. To enhance the peelability of the casing, a "peel coating" is sprayed onto the interior of the casing during the shirring operation.

During the shirring operation a peel composition composed of 0.75% carboxymethyl cellulose, 1.0% sorbitan trioleate and 0.05% polyoxyethylene (23) lauryl ether, the balance being water was sprayed onto the interior surface of a portion of the casings prepared in Example I following the procedure disclosed in U.S. Pat. No. 4,137,947. The casing was then shirred using the apparatus described in U.S. Pat. No. 3,451,827.

The resistance of the casings, both shirred and flat stock, to bursting under stuffing conditions was measured by the Mullen burst test.

Mullen burst tests were performed on dry, i.e., 10% moisture content casing and on conditioned casing having a moisture content that would be typical for a shirred casing to be stuffed. The Mullen bursts were conducted to determine whether the shirring operations would cause a reduction in the burst strength as compared to conventional casing. Typically, the casing of the present invention had a Mullen burst strength per mil thickness in the conditioned state that was higher than that for a plasticized conventional casing, thereby indicating that the reduction in Basis Weight in the casings of the present invention is offset by the increase in casing wall strength resulting from the reduction in plasticizer content and greater density. The data is summarized in Table VII.

TABLE VII
Casing Physical Properties
Mullen Bursts for Flat Stock and Shirred Strand

| Series | Run No. | % Moisture | psi | psi/mil thickness |
|---|---|---|---|---|
| 1 | A | 14.0 | 50.9 | 46.2 |
|   | B | 16.6 | 49.1 | 46.7 |
| 2 | C | 12.2 | 80.6 | 98.3 |
|   | Cb | 17.9 | 54.5 | 67.3 |
|   | E | 17.7 | 42.1 | 50.1 |
|   | F | 14–17 | 33.9 | 39.4 |
| 3 | G | 14–17 | 35.2 | 45.7 |
|   | H | 9.9 | 52.0 | 68.1 |
|   | I | 14–17 | 42.1 | 59.3 |
|   | J | 9.4 | 57.5 | 83.0 |
|   | Jb | 20.9 | 43.4 | 62.4 |
|   | K | 10.7 | 59.6 | 88.1 |
|   | Kb | 15.1 | 45.0 | 67.2 |
| 4 | L | 16.3 | 43.3 | 72.6 |
|   | M | 13.3 | 56.5 | 93.7 |
|   | Ma | 27.5 | 50.4 | 82.6 |
|   | O | 16.5 | 42.0 | 71.2 |
| 5 | X | 14.4 | 49.1 | 104.6 |
|   | Xa | 24.9 | 42.5 | 90.4 |

"a" denotes that the casing is shirred to a 10% shorter strand, i.e., because casing wall is thinner, casing can be compressed to a greater degree to produce a shorter strand.
"b" denotes that the casing is shirred using normal compression. All runs not denoted were measured using flat stock.

EXAMPLE VI

Coated shirred strands prepared in Example V having a moisture content in the commercial range, e.g., 18–21%, were stuffed with sausage emulsion of various compositions used for making frankfurters. The shirred casing strand used was compressed to varying lengths from normal to 30% less than normal. The number of casing defects, i.e., primarily the existance of pinholes, was determined by observing the performance of the strands during shirring and stuffing operations. Shirring of the casing to compressed strands shorter than normal appeared to cause no damage to the casing.

Stuffing was accomplished with a Frank-A-Matic stuffing machine at 130–260 ft/min. using different meat emulsions. The temperature of the meat emulsions was 57° F. The resulting stuffed links were of very uniform diameter. When the meat was cooked and smoked at a normal cycle in conventional smoke houses, a normal color, odor and taste resulted in the final cooked sausages. During the high speed stuffing operation, the casing showed normal pinhole tendencies and broke in excessive amounts only if stuffing was attempted at one to three millimeters above the recommended stuffing diameter. In normal meat packing operations, overstuffing to 1.0 mm above RSD is rarely encountered.

During the cooking process, which was a conventional cook cycle lasting about one and three quarter hours, the yield of weight of frankfurters from a given casing length did not differ materially from that of control of stuffed raw meat in conventional thick walled sausage casings.

The results of the stuffing tests are summarized in Table VIII.

TABLE VIII
Meat Stuffing Test Results

| Series | Run No. | Strand Length | Defects* | Cooked Meat Yield % |
|---|---|---|---|---|
| 1 | A | −20% | 0 | |
|   | B | −20% | 0 | |
|   | C | Normal | 1 | 86.6*** |
| 2 | D | −10% | 1 | |
|   |   | −20% | 0 | |
|   | E | −20% | 0 | |
|   | F | −20% | 0 | |
| 3 | G | −20% | 0 | 90.3–92.2** |
|   | H | Normal | 1 | |
|   |   | −10% | 0 | |
|   |   | −20% | 0 | |
|   | I | −20% | 0 | |
|   | J | Normal | 1 | 89.7–92.2** |

TABLE VIII-continued

Meat Stuffing Test Results

| Series | Run No. | Strand Length | Defects* | Cooked Meat Yield % |
|---|---|---|---|---|
|  |  | −10% | 0 |  |
|  |  | −20% | 0 |  |
|  | K | Normal | 0 | 79.8–84.3*** |
|  |  | −10% | 0 |  |
|  |  | −20% | 1 |  |
| 4 | L | −20% | 0 |  |
|  | M | Normal | 0 | 82.9–85.1**** |
|  |  | −10% | 0 |  |
|  |  | −20% | 0 |  |
|  | O | −20% | 0 |  |
| 5 | X | Normal | 1 | 89.2–92.5** |
|  |  | −10% | 0 |  |
|  |  | −20% | 0 |  |
|  |  | −30% | 0 |  |

*breaks per 4 strands
**beef-pork, 3% salt
***100% pork, 2% salt
****all pork, 3% salt
Control yield for beef-pork 3% salt is 88.1–91.2
Control yield for all pork was 86.6

The data in Table VIII shows that the low basis weight cellulose casing of the present invention having no plasticizer content can be stuffed at the normal 18 to 20% moisture content with an acceptable defect or breakage level and to produce links of standard cooked meat yield.

By way of constrast, Run C casing manufactured without plastizicer under normal (42° C.) coagulation conditions showed a relatively higher defect level during commercial high speed stuffing operations.

EXAMPLE VII

The procedure of Example VI was repeated using a beef-pork emulsion with the exception that the temperature of the emulsion was lowered to 22°–25° F. to simulate frozen turkey stuffing. The results are recorded in Table IX.

TABLE IX

Frozen Meat Stuffing Tests

| Run No. | No. of Strands | Defects |
|---|---|---|
| F | 3 | Break occurred at 26 mm* |
| I** | 2 | 0 |
| G | 10 | 0*** |

*RSD is 22–23 mm
**45° meat emulsion
***Frequent overstuffing occurred

EXAMPLE VIII

The procedure of Example I was repeated with the exception that the coagulation bath was maintained at 38° C. to produce 16 g/10 m BDG casing. The casings were plasticized with glycerine to levels ranging from 0–20% by weight. The skin content of the casings was 18–20%. The dried casings were shirred and humidified to a moisture level of between 13.5% to 20% water.

The humidified shirred strands were stuffed at a meat packing house for making smoked sausages. Stuffing was accomplished at 130–260 ft/min.

The temperature of the beef-pork meat emulsion was 57°. The color of the cooked, smoked casing was normal. Cooked yields were in the order of 90.6–92.1%. The number of casing defects, i.e., the existance of pinholes, was determined by observing the performance of the strands during shirring and stuffing operations. The results of the stuffing tests are recorded in Table X.

For purposes of contrast, the procedure of Example I was repeated with the exception that the coagulation bath temperature was raised to 42.5° C., the temperature at which the coagulation bath is conventionally maintained. The casing had a BDG of 20.3 g/10 m and the skin content was 14%. The color of the smoked, stuffed casing was normal. The number of defects is also recorded in Table X. The comparative run is designated by the symbol "C" in Table X.

TABLE X

| Run No. | Glycerol Content % | $H_2O$ Content % | Strands Tested | Defects Noted |
|---|---|---|---|---|
| 1 | 20 | 20 | 2 | 0 |
| 2 | 20 | 14 | 1 | 0 |
| 3 | 10 | 20 | 2 | 0 |
| 4 | 0 | 20 | 4 | 0 |
| 5 | 0 | 17.5 | 1 | 0 |
| 6 | 0 | 13.5 | 1 | 0 |
| C | 20 | 16–20 | 2 | 0 |

EXAMPLE IX

The procedure of Example VI was repeated with the exception that the interior surface of the casing (Run Nos. 8, 9, Table IX below) was interiorly coated with the peel coating formulation used in Example V, during the shirring operation, or the interior of the casing (Run Nos. 10, 11, Table XI below) was humidified with a formulation composed of a 1% water solution of sorbitan trioleate during the shirring operation. The casings were plasticized with different levels of glycerol. All the casings had a moisture level of 16–18%. The number of defects found in the stuffed strands is recorded in Table XI.

TABLE XI

| Run No. | Glycerol Content % | Strands Tested | Defects Noted |
|---|---|---|---|
| 8 | 0 | 3 | 0 |
| 9 | 10 | 3 | 0 |
| 10 | 0 | 3 | 0 |
| 11 | 10 | 3 | 0 |

What is claimed is:

1. An artificial sausage casing of regenerated cellulose adapted to be shirred and stuffed with meat, produced by annularly extruding viscose into a tubular product having a dried wall thickness of less than about 0.90 mils, regenerating and coagulating the tubular product for sufficient time and conditions to retard the rate of viscose regeneration to coagulation to form a casing product, wherein the casing has a wall thickness less than about 0.90 mils and has a skin cross-sectional area wall structure in which the skin comprises at least 20% of the cross-sectional area of the casing wall, said casing having a plasticizer content of less than 14% based on the weight of the casing.

2. The sausage casing of claim 1 wherein the Basis Weight of cellulose of which the casing is comprised is in the range of about 15 to about 25 grams/square meter of cellulose for a casing dry flat width ranging from about 21 millimeters to about 51 millimeters.

3. The casing of claim 1 wherein the casing is substantially free of plasticizer content.

4. The casing of claim 1 wherein the wall thickness is from about 0.40 to about 0.87 mil in thickness.

5. The casing of claim 1 wherein the skin content comprises from about 20 to about 55% of the cross-sectional area of the wall.

6. The casing of claim 5 wherein the skin content comprises from about 20 to about 30% of the cross-sectional area of the wall.

7. The casing of claim 6 wherein the basis weight of the cellulose of which the casing is comprised is in the range of about 15-25 grams/square meter and the casing has a dry flat width ranging from about 21 millimeters to about 51 millimeters.

8. In the method for producing tubular sausage castings of regenerated cellulose wherein viscose is annularly extruded to form a tubular product and the tubular product is coagulated and regenerated to form gel tubing in a coagulation/regeneration bath and the gel tubing dried to form the casing product, the improvement comprising extruding the tubing to a dry wall casing thickness of less than about 0.90 mils, retarding the rate of regeneration relative to coagulation by maintaining the first coagulation/regeneration bath at a concentration comprising from about 200 to about 300 g/l sodium sulfate and about 90 to about 130 g/l sulfuric acid and a temperature from about 22° to about 38° C., until a dried, thin walled small diameter shirrable casing product having a skin content comprising at least 20% of the cross-sectional area of the casing wall is formed and having a plasticizer content of less than about 14% based on the weight of the casing.

9. The method of claim 8 wherein the coagulation bath is comprised of 100 to 120 g/l sulfuric acid and about 250 to about 280 g/l sodium sulfate.

10. The method of claim 8 wherein the temperature of said bath is from about 28° to about 34° C.

11. The method of claim 8 wherein the tubing is extruded to a dry wall casing thickness from about 0.40 to about 0.87 mils.

* * * * *